United States Patent
Dutu

(10) Patent No.: US 7,110,866 B1
(45) Date of Patent: Sep. 19, 2006

(54) SECURITY ENHANCED AUTOMATIC PILOT SYSTEM FOR AIR VEHICLES

(76) Inventor: Julius Vivant Dutu, 8681 Via Giulia, Boca Raton, FL (US) 33496

( * ) Notice: Subject to any disclaimer, the term of this patent is extended or adjusted under 35 U.S.C. 154(b) by 42 days.

(21) Appl. No.: 10/709,268

(22) Filed: Apr. 26, 2004

(51) Int. Cl.
  G08B 13/00 (2006.01)
  G05D 1/00 (2006.01)
  G05D 3/00 (2006.01)
  G06F 7/00 (2006.01)
  G06F 17/00 (2006.01)

(52) U.S. Cl. ............... 701/11; 340/574; 701/2; 701/3; 701/23

(58) Field of Classification Search ......... 701/2–3, 701/11, 35, 301, 200, 14; 244/118.5, 75 R; 340/945, 540, 573.1, 574, 426.24; 380/258
See application file for complete search history.

(56) References Cited

U.S. PATENT DOCUMENTS

| | | | |
|---|---|---|---|
| 5,067,674 A * | 11/1991 | Heyche et al. ............. 244/190 |
| 5,479,162 A * | 12/1995 | Barger et al. ............. 340/945 |
| 5,933,098 A | 8/1999 | Haxton |
| 5,938,706 A * | 8/1999 | Feldman ................... 701/32 |
| 6,087,942 A * | 7/2000 | Sleichter et al. ........... 340/576 |
| 6,311,272 B1 * | 10/2001 | Gressel ..................... 713/186 |
| 6,348,877 B1 * | 2/2002 | Berstis et al. .............. 340/980 |
| 6,542,796 B1 * | 4/2003 | Gibbs et al. ................. 701/3 |
| 6,559,769 B1 * | 5/2003 | Anthony et al. ........... 340/574 |
| 6,584,383 B1 * | 6/2003 | Pippenger .................. 701/3 |
| 6,675,095 B1 * | 1/2004 | Bird et al. ................. 701/301 |
| 6,691,956 B1 * | 2/2004 | Waterman ................. 244/189 |
| 6,727,800 B1 * | 4/2004 | Dutu ......................... 340/5.53 |
| 6,732,022 B1 * | 5/2004 | Mardirossian .............. 701/3 |
| 6,739,556 B1 * | 5/2004 | Langston .................. 244/189 |
| 6,810,310 B1 * | 10/2004 | McBain ...................... 701/3 |
| 6,842,672 B1 * | 1/2005 | Straub et al. ............... 701/3 |
| 6,904,341 B1 * | 6/2005 | Kish et al. .................. 701/21 |
| 2002/0133294 A1 * | 9/2002 | Farmakis et al. .......... 701/301 |
| 2003/0034902 A1 * | 2/2003 | Dickau ...................... 340/945 |
| 2003/0055540 A1 * | 3/2003 | Hansen ....................... 701/3 |
| 2003/0062447 A1 * | 4/2003 | Condina et al. ......... 244/118.5 |
| 2003/0093187 A1 * | 5/2003 | Walker ....................... 701/1 |
| 2003/0174049 A1 * | 9/2003 | Beigel et al. .............. 340/10.42 |
| 2003/0225486 A1 * | 12/2003 | Mardirossian .............. 701/3 |
| 2004/0056770 A1 * | 3/2004 | Metcalf .................... 340/574 |
| 2005/0001711 A1 * | 1/2005 | Doughty et al. ........... 340/5.74 |

OTHER PUBLICATIONS

Akwagyiram, Britons visiting US face new visa hurdle, , from Evening Standard (London), Jan. 8, 2004, 2 pages.*
Buncombe, Passport to America: US orders fingerprint checks of visitors, The Independent (London)Jan. 6, 2004, 2 pages.*
Holstege, Port terror-ready—on paper, Oakland Tribune, Sep. 10, 2003, 3 pages.*
Various subjects about aircraft hijacking from http://www.answers.com/, 14 pages.*

* cited by examiner

Primary Examiner—Cuong Nguyen
(74) Attorney, Agent, or Firm—Daniel S. Polley, P.A.

(57) ABSTRACT

A security enhanced automatic pilot system for an air vehicle. Upon a change of trajectory for an air vehicle during flight, the pilot is requested to confirm the change in trajectory. Through the placement of the pilot's finger on a fingerprint sensor, messages can be sent regarding the reason for the trajectory change. A first finger can represent a normal message, whereas a second message can represent a security message. Where a security message is sent, the automatic pilot system can automatically direct the air vehicle to a predetermined flight path.

16 Claims, 3 Drawing Sheets

SECURITY ENHANCED AUTOMATIC PILOT SYSTEM FOR AIR VEHICLES

BACKGROUND OF INVENTION

1. Field of the Invention

The present invention relates generally to the operation of an automatic pilot system for flying or air vehicles, especially, during an emergency or security situation.

2. Description of Related Art

Though automatic pilot systems have existed for air vehicles, such as, but not limited to, airplanes, these systems fail to be provided with security systems to prevent the unauthorized tampering or use of the air vehicle. It is to this effective resolution that the present invention is directed.

SUMMARY OF INVENTION

The present invention discloses an enhanced automatic pilot system for operating and controlling an air vehicle such as, but not limited to, airplanes, helicopters, etc. With the use of the present invention system, conditions and scenarios for increasing the security of a flight may be achieved. Though not limiting, increased use of the present invention system, and thus, possibly increased safety, may be achieved by establishing requirements, legislation, regulations, etc. by governmental agencies or authorities, such as, but not limited to, the Federal Aviation Administration, military agencies, and similar agencies or authorities located throughout the world.

A predefined travel or flight route or path (e.g. a certain altitude, coordinates, out over the ocean, etc.) can be established for the system when certain conditions are detected by the present invention. The predefined travel or flight route or path will be referred throughout the application as the Virtual Tunnel. When certain circumstances or situations are detected by the present invention, the automatic pilot system takes control of the air vehicle and directs it to fly in accordance with the predefined Virtual Tunnel. Certain or special circumstances or situations which may justify directing the air vehicle to the Virtual Tunnel can include, but are not limited to, a medical emergency to the pilot(s), a hijacking, terrorist activity, etc. The amount of time the air vehicle travels within the Virtual Tunnel can be limited to a particular amount of time or alternatively can be unlimited.

In an example where the air vehicle is under an emergency situation due to a hijacking or terrorist activity, certain situations may exist: (a) the air vehicle has the same initial pilot(s), but the pilot(s) is(are) threatened by one or more hijackers or terrorist; (b) the air vehicle has a different pilot than initially at takeoff; and/or (c) the pilot(s) has (have) difficulties and cannot communicate his or her (their) problems or emergency situation.

At the time the plane is hijacked or otherwise controlled by one or more unauthorized individuals, the pilot is often requested to change the trajectory of the air vehicle. Additionally, upon learning of a problem in the air vehicle, the pilot may on his or her own change the trajectory in order to activate the authentification portion of the present invention system. The change in trajectory from a predefined trajectory for the flight under normal conditions can be the triggering event for activating the authentification portion.

Once detecting a change in trajectory, the automatic pilot system of the air vehicle automatically asks or requests for a validation from the pilot (or other designated individual) of the change of trajectory. The present invention permits a control tower or other monitoring device, once learning or seeing the change in an expected flight pattern trajectory, to also send or transmit a request or signal to the pilot to authentify or otherwise confirm his or her decision to change the trajectory. The pilot uses the Authentify and Control portion of the present invention to confirm his or her decision to the automatic pilot system, and can also send a signal back to the control tower or other designated recipient.

Thus, though primarily communicating with the automatic pilot system, the present invention can also communicate with a control tower or other monitoring location. The automatic pilot system of the air vehicle, can preferably be in possession of the coordinates and trajectory (and other necessary flight information) from the departure point to the destination point and everywhere in between such points. This information can be stored or otherwise contained within a database associated with the computer/present invention system or the automatic pilot system.

A hijacker, terrorist or other unauthorized individual who takes over command of the air vehicle may try to change the expected or current trajectory, which as mentioned above causes the system to request authentification or confirmation from the pilot that a non-emergency or non-security situation exist and that the pilot intentionally changed the trajectory for some other non-security reason (i.e. weather, etc.). If a non-security confirmation is provided by the pilot or other designated individual (e.g. co-pilot, stewardess, air marshall, etc.), then the automatic pilot system does not get involved and does not direct or steer the air vehicle to the Virtual Tunnel.

The authentification or confirmation request can ask the pilot to place his or her finger three times on a biometric reader, such as, but not limited to a fingerprint sensor. Though the present invention system will be described with placing the pilot's finger three times on a fingerprint sensor, the number three is not considered limiting and any other number of finger placements can be used and are considered within the scope of the invention.

The system can include a database. Biometric or other information of at least one of the pilot's fingers can be stored, programmed, saved or otherwise enrolled in the database. Where one finger is used, this finger can be associated with a valid response, such that when used properly the automatic pilot system knows not to take control of the air vehicle and direct it to the Virtual Tunnel. Use of any other finger and/or the wrong number of consecutive times of the proper finger will cause the automatic pilot system to automatically take over control of the air vehicle and direct it to its Virtual Tunnel flight path. For a validation of a normal situation, the system can be configured such that it requires the placement of the defined finger three consecutive times on the reader. Other number of placement times or other requirements can be used and are considered within the scope of the invention.

For more elaborate use of the present invention, more than one finger can be used, with different fingers having different meanings. A first finger can be associated with a certain defined meaning (e.g. "everything is normal", "everything O.K.", "no problems", etc.), while a second finger can be associated with a different defined meaning (e.g. highjacking, terrorist situation, etc.). Additionally, a third finger could be used and associated with a non-security but emergency situation (i.e. engine problem, medical emergency of pilots, gas leak, fuel issues, etc.).

In this elaborate scenario, for a validation of a defined meaning, the system can be configured such that all three times a finger is placed on the reader, the same finger must be placed. Other number finger place times or requirements can be used and are considered within the scope of the invention. Where a normal (first finger placed three times) indication is provided by the pilot, operation remains as is conventionally practiced and the automatic pilot system does not take control and does not steer the air vehicle to the Virtual Tunnel. However, where an emergency (second or third finger placed three times) indication is provided by the pilot, the automatic pilot system is configured to automatically engage or activate to take over control of the air vehicle and direct the air vehicle for travel or flight along the Virtual Tunnel.

The automatic pilot system can also be programmed to be automatically engaged or activated and take over where any other combination of placement of the first finger and the second finger or third finger does not result in the first finger being placed three consecutive times on the fingerprint sensor. Other combination can also be selected and are considered within the scope of the invention. Furthermore, the present invention is not limited to any particular finger being associated with a normal condition, a security emergency and/or a non-security emergency situation. However, it is preferred that the pilot or other designated individual know in advance which finger represents which message, to prevent the wrong message from being inadvertently transmitted.

The system can also be provided with an optical or visual device, such as, but not limited to a LED light, preferably green in color. Other bulbs and colors can also be used and are considered with the scope of the invention. The system can be configured such that whenever a finger is placed on the reader, it causes the light to illuminate, so that even if the wrong finger is intentionally placed, a highjacker, terrorist or other unauthorized individual may believe that everything is alright or that the pilot is complying with such unauthorized individual's demands.

The system can be designed to illuminate each time a finger is placed, but illuminate one way for a proper validation (i.e. stay on constantly) and illuminate a different way for the placement of the wrong finger (blinking lights). Other differing combinations of light patterns can be used and are considered within the scope of the invention. Thus, when a proper finger whose information is already stored or otherwise contained within the database is placed the required amount of times on the reader (i.e. three times), the light bulb can be energized all the time (i.e. stay lighted green in the case of the green LED). This can indicate that a proper reading and/or placement of the finger have occurred. Where the finger information is not contained within the database the light bulb can be illuminated but in a blinking or other differing pattern.

The system can also be configured such that the pilot or other designated individual can also deactivate or otherwise take back control over the air vehicle or otherwise direct the air vehicle out of the Virtual Tunnel (i.e. where the terrorist or highjacker is killed or subdued, etc.). The pattern of finger placement for this feature is not limited to any particular pattern.

Additionally, in addition to a single pilot placing his or her finger, the required pattern for automatically directing or controlling the air vehicle's automatic pilot system to and/or out of the Virtual Tunnel can be set to be provided from more than one individual (e.g. pilot and co-pilot, pilot and stewardess, pilot and air marshall, co-pilot and stewardess, co-pilot and air marshall, etc.).

The amount of change in trajectory from a predefined or predetermined trajectory associated with a non-eventful flight that can act as the trigger event for detection and questioning is not limited to any particular value and any percentage or amount can be used and is considered within the scope of the invention.

It should be recognized that other conditions (i.e. change in height, speed, etc.), in addition or alternatively to trajectory, can be used as a triggering event to request confirmation for the change. Thus, the use of the word "trajectory" is considered to encompass all of these triggering changed conditions.

It is therefore an object of the present invention to provide for an automatic pilot system for an air vehicle which detects and questions changes in trajectory of the air vehicle from a predefined or predetermined trajectory for the air vehicle.

It is another object of the present invention to request a pilot confirmation when a change in trajectory over a predetermined limit has been detected.

It is still another object of the present invention to provide a method for automatically activating an automatic pilot system of an air vehicle based on a pattern of finger placements on a biometric reader in communication with the automatic pilot system.

It is yet another object of the present invention to automatically direct the air vehicle to a predetermined flight route in the event of an emergency and/or security situation.

The Summary of the Invention and Abstract sections are not considered to be limiting in any manner.

DETAILED DESCRIPTION

Figure 1:
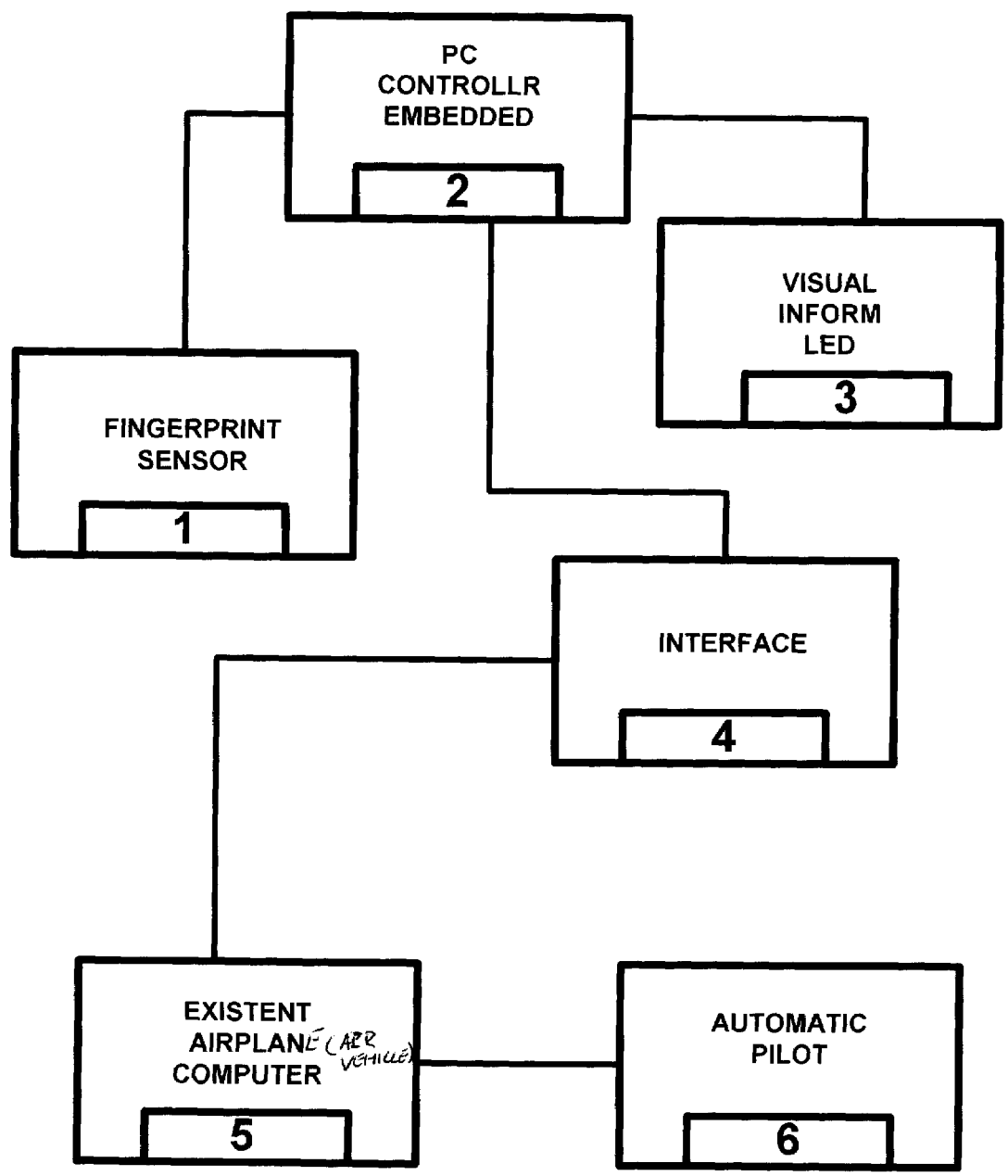
FIG. 1 is a block diagram of a first embodiment for the present invention.

As seen in the Figure, the enhanced automatic pilot system of the present invention is illustrated and can be used for controlling and/or instructing the automatic pilot system of the of airplanes unlock is illustrated. FIG. 1 illustrates a block diagram of one possible physical configuration for the preferred embodiment of the present invention.

Block 1 illustrates a biometric reader, such as, but not limited to an Integrated circuit fingerprint sensor for the system (i.e. such as, though not limited to, sensors manufactured and sold by AuthenTec, Inc.) The sensor can be a preferably durable, extremely reliable semiconductor device that can acquire a fingerprint image under the most rigorous real world conditions. Preferably, the sensor can be enabled and performance-enhanced by advanced imaging control software. This highly adaptive software mechanism automatically manages and performance-tunes the image detection and acquisition process. Using Direct Digital Synthesis, an external source provides signal to the drive ring. Each element in the sensor matrix is provided with an under-pixel amplifier, a synchronous demodulator, and a spatial filter node. Each sensor row uses a multiplex to combine the output of all elements into a single signal. When a finger is placed on the sensor matrix, a very small signal is coupled from the drive ring to the sub dermal layer of the skin (See FIG. 4 for Sensor Matrix and Drive Ring). This signal can follow the ridges and the valleys of the true fingerprint image. A fingerprint image is scanned by digitizing the outputs from one sensor row at a time in an image, power is applied to the selected row, enabling the row to drive an analog channel bus. The sample and hold outputs are digitized and sent serially via the host interface to the True Print imaging processing algorithm.

Other means for authenticating permitting access, such as, iris, image face, DNA, etc., can be used in lieu of the fingerprint sensor and are considered within the scope of the invention. Additionally, various types of sensors, including other fingerprint sensors from the fingerprint sensor discussed above, can be used and are also considered within the scope of the invention.

Block 2 illustrates the PC Controller for the system. In one embodiment the controller can be a single board computer and/or an embedded system, though such is not limiting. The PC Controller can store the authorized biometric information and the information for coordinates for the Virtual Tunnel. The database can be provided as part of the components identified in Block 2. The trajectory for the flight of the air vehicle can also be stored within the same or a different database that is provided as part of the components of Block 2.

Block 4 illustrates the Interface component of the system.

Block 5 illustrates the air vehicle's existing computer which can be used in connecting or otherwise providing communication between the automatic pilot component (Block 6) and the other components of the system in conjunction with the Interface (Block 4), in the event the automatic pilot component is provided as separate or independent subsystem (as shown in Block 6) as compared to being provided as part of the existing air vehicle's computer.

A visual information provider (Block 3) can be provided with the present invention system. Though not limiting, in one embodiment the provider can be a light assembly in communication with the PC Controller (Block 2). A LED bulb can be used in the light assembly, though other types of bulbs can be used and are considered within the scope of the invention. In one embodiment, a green LED bulb can be provided through other color bulbs can be used and are also considered within the scope of the invention.

Though not limiting, the system preferably operates at a temperature range which is compatible to the range of military and/or air flight standards, such as but not limited to, approximately −40° Celsius to approximately +85° Celsius. Additionally, the system preferably operates between approximately 7.5 Volts to approximately 38 Volts, though again such range is not considered limiting. Furthermore, the system preferably operates at a maximum of 0.6 Amps, and typically at 0.2 Amps, though again these figures are also not considered limiting.

Functionality and Interconnections

The present invention can preferably use the interface (Block 4) in order to enable/disable the automatic pilot system for directing the air vehicle to and from the Virtual Tunnel. In certain configuration, the interface (Block 4) may be eliminated, such as, but not limited to, where a computer of the air vehicle can support direct communication with the PC Controller (Block 2). The biometric reader or fingerprint sensor (Block 1) which reads the fingerprint, preferably authorizes all the commands, submitting them to the controller PC2 (Block 2).

Once scanned and recognized (matching the data stored in the database) by the controller PC2, the fingerprint authorizes the Interface (Block 4) to communicate where required or requested, or to direct the existing airplane computer (Block 5). In either scenario or configuration, the existing air vehicle computer (Block 5) receives the signal to initiate the automatic pilot system in accordance with the present invention (Block 6).

The fingerprint sensor or biometric reader (Block 1) is preferably not affected by any mechanical vibrations. Other factors (such as humidity, air pressure, cabin pressure and temperature fluctuations) which may effect its operation can be controlled by software. As is conventionally known, internal software can also be used and programmed to control possible radio waves interference.

All the components used to build the present invention system (Interface 4 included) are preferably chosen to perform very well even in drastic environmental conditions.

The system can be powered by the battery of PC Controller (Block 2), which can be designed to be charged or can be powered by other conventional energy sources including existing sources on the air vehicle. The system is designed to be very flexible and to operate in very hard conditions (i.e. high altitude, water and salt in a marine environment).

Figure 2:
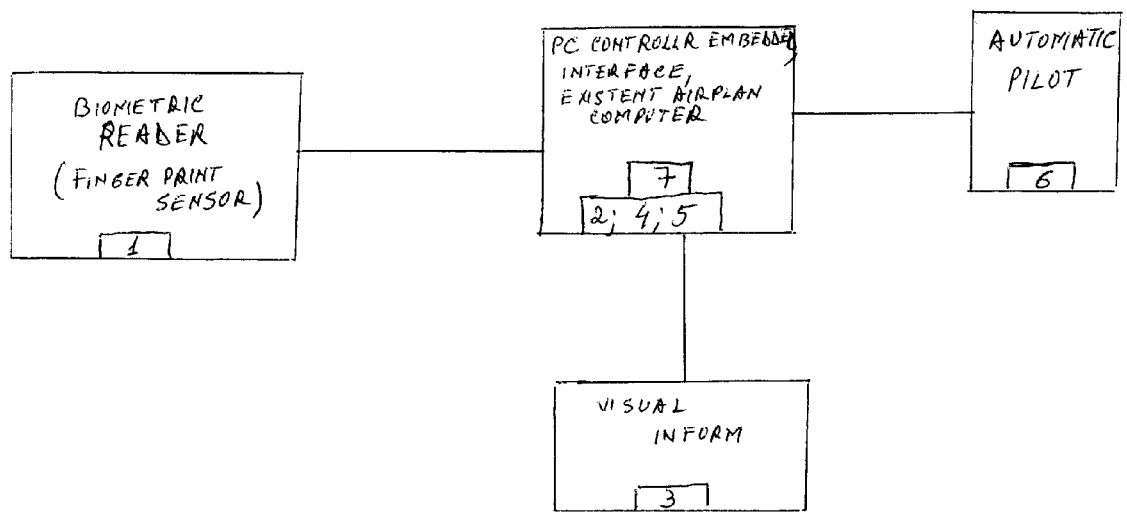
FIG. 2 is a block diagram of a second embodiment for the present invention.
Figure 3:
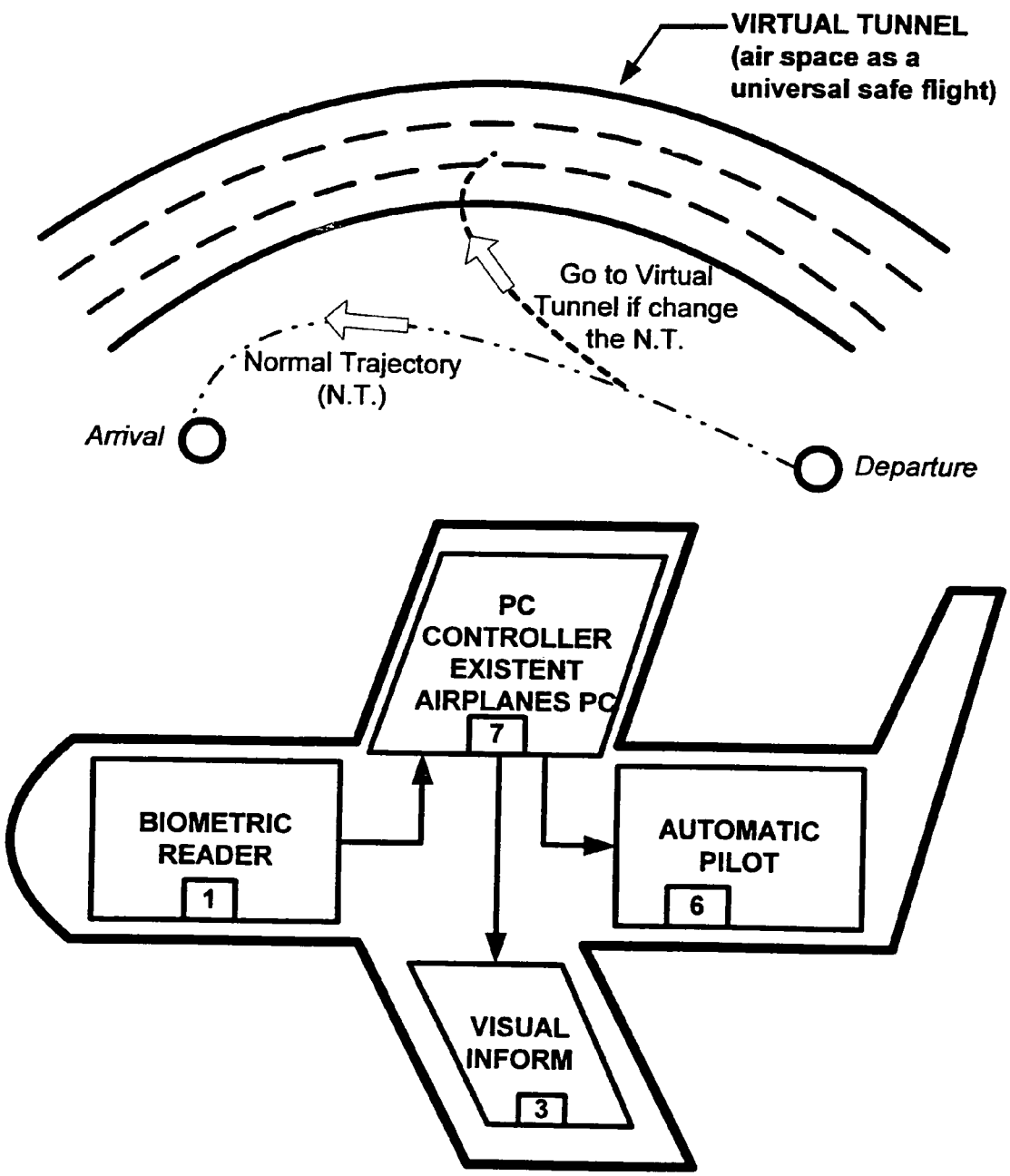
FIG. 3 is a block diagram of the main components of the present invention and generally illustrates the safe flight path in accordance with the present invention.

All embodiments of the present invention can provide in one or more embedded boards (preferably one) the functionality of the PC controller, the interface and existing air vehicle computer, without modifying the functionality of the system but possibly making the system more robust, useful, flexible, and/or reliable. A specialized microprocessor can be integrated in the air vehicle computer as shown in FIG. 2.

All conventional uses and configurations for an automatic pilot system can remain, with the present invention providing added security to the air vehicle through its automatic pilot system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for providing added security to an air vehicle during flight, said method comprising the steps of:
   (a) providing predefined flight path information for an air vehicle for a specific air flight; wherein the predefined flight path information is stored in an onboard system of the air vehicle;
   (b) automatically detecting a change in the predefined flight path based on a change in flight trajectory of the air vehicle;
   (c) automatically requesting a response by the onboard system from an individual located in the air vehicle where the change in the predefined flight path exceeds a predefined threshold;
   (d) automatically directing the air vehicle to a predetermined safety flight path by an automatic pilot system of the air vehicle when a proper override response is not received from the individual located in the air vehicle;
   wherein said predetermined safety flight path being different than said predefined flight path; wherein said predetermined safety flight path is programmed within the onboard system at the time of take off of the air vehicle;
   wherein a predefined proper override response in the onboard system prior to take off corresponds to authorized biometric information of the individual;
   wherein the air vehicle is automatically directed to the predetermined safety flight path without receiving a signal from a location remote to the air vehicle.

2. The method of claim 1 further comprising the step of providing a predefined proper response in the onboard system prior to take off.

3. An onboard system located on an air vehicle for providing added security for the air vehicle, said system comprising:

a biometric reader located within an air vehicle;

a PC controller located within the air vehicle and in communication with said biometric reader, said PC controller storing authorized biometric information and predefined coordinate information for a safe flight path prior to take off the air vehicle, said PC controller in communication with an existing computer of the air vehicle, wherein the existing computer is in communication with or includes an automatic pilot system of the air vehicle; and a database located on the air vehicle and having a predefined flight path for at least one future trip for the air vehicle, wherein said PC controller is in communication with said database or is included as part of said PC controller;

wherein when a change in flight trajectory of the air vehicle causes a change in the predefined flight path to exceed a predefined threshold that is automatically detected by said PC controller, said PC controller automatically requests an onboard response corresponding to stored authorized biometric information;

wherein in the event no onboard response is timely received or an improper response is received through the biometric reader, said PC controller automatically instructs the existing air vehicle computer to activate the automatic pilot system to direct the air vehicle coordinates to those correspond to the safe flight path and without receiving a signal from a location remote to the air vehicle wherein said safe flight path is information stored prior to take off regarding a predefined universal air space for use by traveling air vehicles and is determined independent of a current location of the air vehicle at the time the air vehicle computer is automatically instructed by the PC controller to direct the air vehicle to the safe flight path.

4. The system of claim 3 further comprising a means for providing a visual indicator when a response is inputted through said biometric reader; said means for providing in communication with said PC controller.

5. The system of claim 3 wherein said PC controller is in communication with said existing computer of the air vehicle through an interface.

6. The system of claim 3 wherein said PC controller is a single board computer or an embedded system.

7. A self-contained onboard system located on an air vehicle for providing added security for the air vehicle, said system comprising:

a database having a predefined flight path for a vehicle and a predefined proper override response stored therein, said database located within the air vehicle;

onboard means for automatically detecting a change in the predefined flight path based on a change in flight trajectory of the air vehicle;

onboard means for automatically requesting a response from an individual located in the air vehicle where the change in the predefined flight path exceeds a predefined threshold;

onboard means for inputting responses provided in view of a request from said onboard means for automatically requesting; and onboard means for automatically instructing an automatic pilot system of the air vehicle to automatically direct the air vehicle to a predetermined safety flight path when a response matching the stored predefined proper override response is not received from the individual located in the air vehicle; wherein said predetermined safety flight path being different than said predefined flight path;

wherein said predetermined safety flight path is information stored onboard, prior to take-off, regarding a universal safe air space for use by traveling air vehicles and is determined independent of a current location of the air vehicle at the time the automatic pilot system is automatically instructed to direct the air vehicle to the predetermined safety flight path;

wherein said onboard means for automatically instructing communicates with said automatic pilot system without receiving a signal from a location remote to the air vehicle.

8. The onboard system of claim 7 wherein said means for inputting is a biometric reader.

9. The onboard system of claim 8 wherein said biometric reader is a fingerprint sensor.

10. The onboard system of claim 7 wherein the predefined proper override response is a sequence of inputs based on one or more biometric information specific to the individual.

11. The onboard system of claim 7 further comprising an illumination member in communication with said means for inputting responses.

12. The onboard system of claim 11 wherein said illumination member is energized each time a response is inputted by said means for inputting responses.

13. The onboard system of claim 11 wherein said illumination member is energized each time an improper response is inputted by said means for inputting responses.

14. The onboard system of claim 11 wherein said illumination member is energized each time a proper response is inputted by said means for inputting responses.

15. The onboard system of claim 11 wherein said illumination member is a L.E.D. light assembly.

16. A self-contained onboard system located on an air vehicle for providing added security for the air vehicle, said system comprising:

a database having a predefined flight path for a vehicle and a predefined proper override response stored therein, said database located within the air vehicle;

onboard means for automatically detecting a change in the predefined flight path based on a change in flight trajectory of the air vehicle;

onboard means for automatically instructing an automatic pilot system of the air vehicle to automatically direct the air vehicle to a predetermined safety flight path where the change in the predefined flight path exceeds a predefined threshold;

onboard means for automatically requesting a response from an individual located in the air vehicle to override the instruction to automatically direct the air vehicle to the predetermined safety flight path; and onboard means for inputting responses provided in view of a request from said onboard means for automatically requesting;

wherein when a response matching the stored predefined proper override response is received from the individual located in the air vehicle said automatically instructing is deactivated to permit the air vehicle to be operated under normal conditions;

wherein said predetermined safety flight path being different than said predefined flight path;

wherein said predetermined safety flight path is stored within said automatic pilot system prior to take off of the air vehicle;

wherein said onboard means for automatically instructing communicates with said automatic pilot system without receiving a signal from a location remote to the air vehicle.

* * * * *